United States Patent [19]
Johnson et al.

[11] 3,985,573
[45] Oct. 12, 1976

[54] SLOTTED CATHODE COLLECTOR BOBBIN FOR USE IN LIQUID CATHODE CELL SYSTEMS

[75] Inventors: Daniel H. Johnson, Parma Heights; David M. Kubala, Cleveland; Roswell J. Bennett, Lakewood, all of Ohio

[73] Assignee: Union Carbide Corporation, New York, N.Y.

[22] Filed: June 30, 1975

[21] Appl. No.: 592,091

[52] U.S. Cl. .............................. 429/133; 429/161
[51] Int. Cl.² ...................................... H01M 43/00
[58] Field of Search ............ 136/107, 13, 14, 134, 136/120 R, 6 LN, 6 F, 121, 123, 100 R, 83 R, 123

[56] References Cited
UNITED STATES PATENTS

| | | | |
|---|---|---|---|
| 3,069,485 | 12/1962 | Winger et al. | 136/107 X |
| 3,156,585 | 11/1964 | Yamano et al. | 136/14 X |
| 3,510,358 | 5/1970 | Nabiullin et al. | 136/107 |
| 3,796,606 | 3/1974 | Lehmann et al. | 136/13 |

*Primary Examiner*—Anthony Skapars
*Attorney, Agent, or Firm*—Cornelius F. O'Brien

[57] ABSTRACT

The invention relates to an electrochemical cell employing a liquid active cathode material in conjunction with an active metal anode and an elastically deformable carbonaceous cathode collector in the form of a slotted annular bobbin.

18 Claims, 7 Drawing Figures

SLOTTED CATHODE COLLECTOR BOBBIN FOR USE IN LIQUID CATHODE CELL SYSTEMS

FIELD OF THE INVENTION

The invention relates to a liquid active reducible cathode cell employing a cathode collector bobbin in the form of an elastically deformable carbonaceous slotted annular bobbin, said cathode collector bobbin being radially compressed prior to assembly in the cell so that when inserted in the cell, the radial expansion of the bobbin will provide a good contact against the separator which, in turn, contacts the anode of the cell thereby maintaining a low internal resistance in the cell during discharge.

BACKGROUND OF THE INVENTION

The continuing development of portable electrically powered devices such as tape recorders and playback machines, radio transmitters and receivers, and the like, creates a continuing demand for the development of reliable, long service life cells or batteries for their operation. Recently developed electrochemical cell systems that will provide a long service life utilize highly reactive anode materials such as lithium, sodium, and the like, in conjunction with high energy density liquid cathode materials and nonaqueous electrolytes. However, the conventional cyclindrical cell structures are not ideally suited for the components of these high energy cell systems. For example, in a cylindrical cell, if the anode is disposed in contact with the inner surface of the cell casing and spaced apart a fixed distance from a centrally located cathode collector by a conventional separator member, then although good contact can be provided between these components when they are assembled in the cell, the contact between these components will decrease as the anode dissolves during discharge. Consequently, the dissolving of the anode during discharge will decrease the volume of the anode and thus tend to increase the distance between the anode and the separator/cathode collector components of the cell thereby decreasing the contact between these components which will result in an increase of the internal resistance of the cell.

To overcome the above disadvantage when using the components of such high energy density cell systems, it has been proposed that the components be assembled in rolled or coiled electrode assemblies (jelly roll construction) which would ensure good contact between the components of the cell during discharge. This type of cell construction is disclosed in U.S. Pat. No. 3,809,580 and in U.S. application Ser. No. 563,321 by D. H. Johnson filed Mar. 31, 1975. Although the jelly roll construction is suitable for liquid cathode cell systems, jelly roll cells are rather expensive to make and time consuming to fabricate and assemble.

U.S. Pat. No. 3,796,606 discloses a cylindrical electrochemical cell whose positive electrode is in contact with the outer casing of the cell and separated by a porous separator from a negative electrode constituted by a sheet of metal having a very negative standard oxidation potential surrounding an elastically deformable current collector having a split cylindrical shape in which the elasticity of the current collector enables it to maintain biased contact with the negative electrode at all times notwithstanding alteration in electrode volumes during discharge of the cell and thus to maintain the reacting surfaces of the solid positive and negative electrodes at optimum distances by continuously biasing the negative electrode against the porous separator.

It is an object of this invention to provide an electrochemical cell employing a liquid active cathode material in conjunction with an active metal anode and an elastically deformable carbonaceous cathode collector in the form of a slotted annular bobbin.

It is another object of the present invention to provide a nonaqueous cylindrical cell employing an elastically deformable carbonaceous cathode collector in the form of a slotted annular bobbin having a screen or like spring member longitudinally embedded within said bobbin so as to bias the bobbin radially outward and thereby maintain the anode, separator and cathode collector of the cell in good physical and electrical contact.

It is another object of the present invention to provide a nonaqueous cylindrical cell having component parts easy to assemble and which will exhibit a relatively low internal cell resistance during discharge.

The foregoing and additional objects will become more fully apparent from the following description and the accompanying drawings.

SUMMARY OF THE INVENTION

The invention relates to an electrochemical cell comprising an electrically conductive can closed at one end and open at the other end; an anode layer disposed within and in surface contact with said can thereby adapting said can as a first terminal for the cell; a porous separator layer disposed within and in surface contact with said anode layer; an elastically deformable carbonaceous cathode collector in the form of a slotted annular bobbin disposed within and in surface contact with said separator layer, said cathode collector exerting a mechanical bias against said separator which in turn contacts the anode thereby effectively maintaining good physical and electrical contact between the cathode collector, separator and anode during discharge of the cell; an active reducible cathode solution disposed within and through said cathode collector and said separator layer; a cover for said can; an insulating member interposed between said cover and the open end of said can such that a seal is formed between said cover and said can; and an electrical conductive means contacting said cathode collector and said cover thereby adapting said cover as the second terminal of the cell.

The cathode collector of this invention serves to conduct current to the cell closure terminal and, since it is to be used in conjunction with a liquid active cathode depolarizer, serves as reaction sites for the cathodic electrochemical process of the cell. Thus the cathode collector must be an electronic conductor, have a reasonable porosity for maintaining accessible reaction sites and be of a material capable of catalyzing or sustaining the cathodic electrochemical process. Materials suitable for use as a cathode collector are carbon materials with acetylene black being preferable. In addition to the above characteristics, the cathode collector must be elastically deformable so that when molded into a longitudinally slotted annular bobbin or the like, it can be slightly radially compressed and, upon release, return substantially to its original geometry without breaking. To impart this characteristic to the cathode collector, a suitable flexible binder material, with or without plasticizers and with or without stabilizers, has to be added to the carbon material. Suitable flexible binder materials for this purposes would include elastomers, such as rubbers, both natural and synthetic, vinyl polymers, polyethylene, polypropylene, acrylic polymers, polystyrene and the like with polytetrafluoroethylene being the preferred. The binder should be added in an amount between about 10% and about 30% by weight of the molded cathode collector since an amount less than 10% would not provide sufficient strength or elasticity to the molded body while an amount larger than 30% would wetproof the surface area of the carbon thereby reducing the access to the reaction sites required for the cathodic electrochemical process of the cell. Preferably, the binder should be between 15% and 25% by weight of the collector. Of importance in selecting the materials for the cathode collector is to select materials that will be chemically stable in the cell system in which they are to be used.

As used herein, a cathode collector bobbin or bobbin shall mean a bobbin in the form of a slotted annular tube.

A conductive strip or rod, such as nickel, secured at one end to a conductive sheet or screen, such as nickel, could be employed as the electrical conductive menas for contacting the cathode collector bobbin and the cover of the cell so as to adapt the cover as the cathodic terminal of the cell. This could be accomplished by using a conductive sheet or screen larger than the axial opening in the bobbin so that when the sheet or screen end of the strip or rod is curled and inserted into the axial opening in the bobbin, the expansion of the curled sheet or screen within the bobbin will provide good electrical contact to the bobbin. The opposite end of the strip or rod could then be secured in a conventional manner to the cover of the cell thereby adapting the cover as the cathodic terminal of the cell.

The cathode collector bobbin of this invention could also be made with a chemically stable spring member, preferable in the form of an arcuate perforated sheet, longitudinally embedded within the bobbin so as to add strength and elasticity to the bobbin. Thus the spring-embedded bobbin could be radially compressed prior to being assembled in a cell so than when inserted within the cell, the radial expansion of the bobbin will provide good contact against the separator which in turn contacts the anode of the cell thereby maintaining a low internal resistance in the cell during discharge. The elastic characteristics of this embodiment of the bobbin will be due to the elastic deformability of the cathode collector materials and also to the spring action of the spring member embedded within the bobbin. Thus, using this embodiment of the invention, excellent contact can be maintained between the cathode collector, separator and the anode. An additional benefit of this embodiment is that a narrow width of the spring member, if conductive, could be extended above the bobbin where it could then be secured to the cover of the cell in a conventional manner thereby adapting the cover as the cathodic terminal of the cell. In another embodiment, a separate conductive strip, such as nickel, could be secured at one end to the spring member and at its other end to the cover of the cell so as to adapt the cell cover as the cathodic terminal of the cell.

The cell made in accordance with this invention will employ a preformed elastically deformable carbonaceous cathode collector having the following advantages:

1. The radial compression and expansion characteristics of the cathode collector will permit the diameter of the collector to be reduced for easy insertion into the can of the cell whereupon the collector will then radially expand to provide good contact with the separator which in turn contacts the anode of the cell thereby providing for minimum resistance losses within the cell.

2. The axial opening within the cathode collector provides a reservoir for the liquid cathode depolarizer which will enable rapid diffusion of the reaction material to the anode/cathode reaction interface.

3. The cathode collector will permit an in-depth electrochemical reduction of the liquid cathode depolarizer within the porous collector.

The liquid active reducible cathode materials for use in this invention can be employed by themselves, mixed with a conductive solute which is a non-reactive material but is added to improve conductivity of the liquid active reducible cathode materials, or mixed with both a conductive solute and an electrochemically active or nonreactive cosolvent material. When an electrolyte solvent performs the dual function of acting as solvent for an electrolyte salt and as the active cathode material of the cell, then it is referred to as a "cathode-electrolyte". In a fully assembled cell a liquid cathode, with or without a solute, could be placed into the axial opening of the cathode collector where it would then permeate through the cathode collector and then through the separator to contact the anode of the cell. In addition, the separator could be soaked with the liquid cathode prior to its being assembled in the cell or after it is assembled in the cell. Thus the axial opening in the cathode collector could be used as a reservoir for the liquid cathode.

Suitable nonaqueous cathode materials for use in this invention could be one or more of the oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 48th Edition, The Chemical Rubber Co., Cleveland, Ohio 1967–1968. For example, such non-aqueous cathode materials would include sulfuryl chloride, thionyl chloride, phosphorus oxychloride, thionyl bromide, chromyl chloride, vanadyl tribromide, selenium oxychloride, liquid sulfur dioxide, sulfur monochloride, sulfur momobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. In addition to the above, liquid halogens (or their solutions) could be used, such as bromine, liquid chlorine or iodine (in solution). Examples of suitable anodes for use in nonaqueous cells would include lithium, sodium, calcium, magnesium, lithium monoaluminide and lithium-magnesium.

Suitable aqueous cathode materials for use in this invention include aqueous solutions of persulfate, peroxide, permanganate and chromic acid. Examples of suitable anodes for aqueous cells would include aluminum, magnesium, zinc and cadmium.

Some preferred combinations of nonaqueous cathode materials and anodes would be as follows:

1. sulfuryl chloride/Li or Na;
2. thionyl chloride/Li or Na;

3. phosphorus oxychloride/Li or Na;
4. sulfur monochloride/Li or Na;
5. sulfur monobromide/Li or Na;
6. selenium tetrafluoride/Li or Na.

Some preferred combinations of aqueous cathode materials and anodes would be a zinc, magnesium or aluminum anode in an aqueous solution of persulfate or chromic acid.

The solute for use in this invention may be a simple or double salt which will produce an ionically conductive solution when dissolved in a solvent such as an oxyhalide of a Group V or Group VI element of the Periodic Table. Preferred solutes are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December, 1938, pages 293–313 by G. B. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired, a stable cosolvent in the cell system may be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, γ-butyrolactone, sulfolane, ethylene glycol sulfite, dimethyl sulfite, dimethyl sulfoxide, benzoyl chloride, dimethoxyethane, dimethyl isoxazole, diethyl carbonate, and the like.

The separator for use in this invention has to be chemically inert and insoluble in the liquid cathode material and have a porosity of about 25% or more, preferably about 50%, so as to permit the liquid cathode material to permeate through and contact the anode layer. Suitable separators for use in this invention that will remain stable in the presence of liquid cathode materials, for example, liquid oxyhalide cathode materials, are the nonwoven glass separators, preferably those separators that incorporate long glass fibers along with the short glass fibers since such a combination increases the tear strength of the separators the reby making them easier to handle.

The can and cover for use in this invention can be stainless steel, nickel-plated steel or some other conductive material that will not corrode or otherwise deteriorate when in contact with the liquid cathode materials. Preferably the can and cover could be made of 304-stainless steel which has been heat-treated to release the inherent stresses introduced during conventional drawing operations. For large cells, the cathodic terminal or cover of the cell would usually be in the form of a metallic disk having a diameter slightly less than that of the can. An insulating gasket member would then be employed to provide a seal between the cover and the can. For smaller cells, the cathodic terminal or cover of the can could be in the form of a central metal member embedded in and extending through an insulating disk member, the latter providing a seal between the central metal member, for example a rivet, and the can.

The insulating member disposed between the cover and the can has to be stable in the presence of the cell components and can be selected from such materials as polytetrafluoroethylene (e.g., "Teflon"), fluorinated ethylene-propylene polymer (e.g., FEP), ethylene copolymer with FEP (e.g., "Tefzel"), chlorotrifluoroethylene polymer (e.g., "Kel-F"), perfluoro-alkoxy polymer (e.g., PFA), tetrafluoroethylene polymer (TFE), and the like.

The present invention will become apparent from the following description thereof when considered together with the accompanying drawings which are set forth as being exemplary of embodiments of the present invention and are not intended, in any way, to be limitative thereof and wherein.

Figure 1:
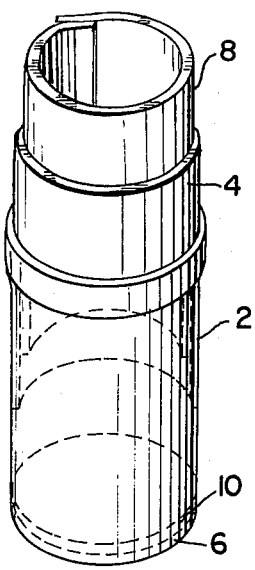
FIG. 1 is a perspective view of an anode and separator partially assembled in a cell can.

Referring in detail to FIG. 1, there is shown a cylindrical can 2 having partially disposed therein an anode liner 4 in contact with the inner upstanding circumference of the can 2 and completely disposed therein a bottom anode disk 6, shown in broken lines, in contact with the base of the can 2 thereby adapting the container as the first or anodic terminal for the cell. Partially disposed within and in contact with the inner circumference of anode liner 4 is a separator liner 8 while a bottom separator disk 10, also shown in broken lines, is in contact with the bottom anode disk 6. If desired, the anode material could be extruded within the can.

Figure 2:
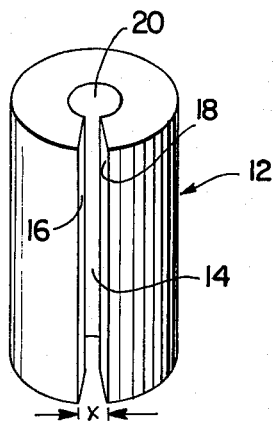
FIG. 2 is a perspective view of a slotted cathode collector bobbin of this invention.

A slotted cathode collector bobbin 12 is shown in FIG. 2 having a longitudinal slot 14 with opposing faces 16 and 18 and an axial opening 20. The width X of slot 14 can vary somewhat as long as it is sufficient so that the bobbin can be radially compressed to reduce its diameter an amount sufficient to enable it to be easily slid into the anode-separator-lined can whereupon it will then radially expand to exert a bias against the separator layer which in turn contacts the anode so as to effectively maintain good physical contact between these components during cell discharge. For conventional size cells, the width X of slot 14 for the bobbin could vary between about 0.05 inch (0.13 cm) and about 0.40 inch (1.02 cm), preferably about 0.075 inch (0.19 cm) for "AA" size cells, about 0.125 inch (0.32 cm) for "C" size cells, and about 0.20 inch (0.51 cm) for "D" size cells.

Figure 3:
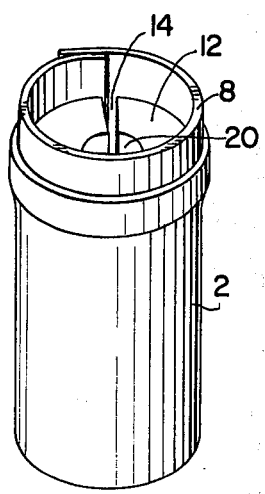
FIG. 3 is a perspective view of an anode, separator and cathode collector bobbin assembled in a cell can.
Figure 4:
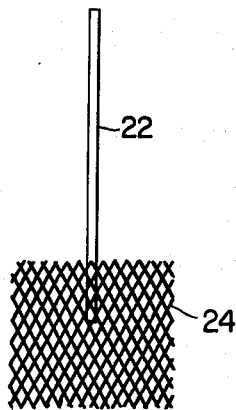
FIG. 4 is a perspective view of a conductive strip having secured at one end a conductive screen.
Figure 5:
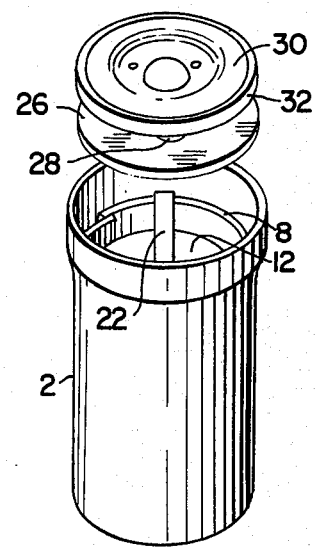
FIG. 5 is a partially exploded view of a cell employing a slotted cathode collector of this invention.
Figure 6:
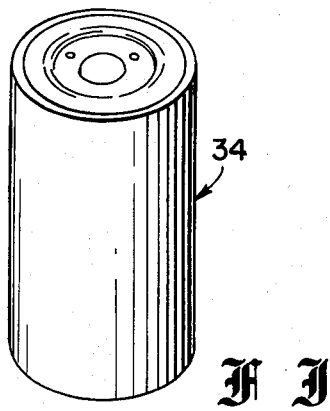
FIG. 6 is a perspective view of a completely assembled cell.

FIG. 3 shows the same numbered components of FIGS. 1 and 2 in an assembled form. FIG. 4 shows an electrically conductive strip 22 secured at one end to a conductive screen 24 such as an expanded nickel screen. The conductive screen 24 is curled and then force-fitted into the axial opening in the cathode collector bobbin. As shown in FIG. 5, with the curled screen disposed within the axial opening of bobbin 12 so as to provide a good electrical contact therebetween, the opposite end of the strip 22 projects above the surface of bobbin 12. An insulator disk 26 has a central opening 28 through which the projected portion of the strip 22 passes, whereupon the strip is then welded or otherwise secured to cover 30 thereby adapting cover 30 as the second or cathodic terminal of the cell. An insulating gasket or ring 32 is shown assembled with cover 30 in FIG. 5 so that when said cover ring assembly is placed on top of container 2 after the liquid cathode has been fed into the cell, insulating ring 32 will be interposed between cover 30 and container 2 whereupon conventional techniques such as the radial-squeeze technique can be used to seal the cell. A fully assembled cell 34 is shown in FIG. 6.

Figure 7:
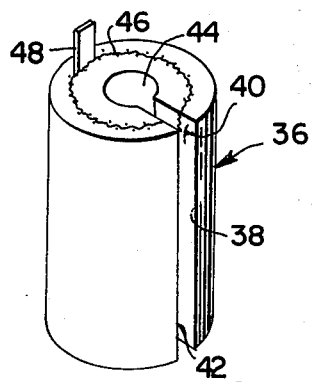
FIG. 7 is a perspective view of another embodiment of a slotted cathode collector bobbin having a spring member longitudinally embedded therein.

Another embodiment of a cathode collector bobbin is shown in FIG. 7. Specifically, a slotted bobbin 36 is shown as having a longitudinal slot 38 with opposing faces 40 and 42 and an axial opening 44. Unlike the bobbin shown in FIG. 2, bobbin 36 is formed with an expanded or mesh screen 46, such as nickel, embedded longitudinally within the bobbin 36 approximately midway of its radial length. Screen 46, as discussed above, will add strength and flexibility to the bobbin so as to facilitate its handling during assembly of the cell and also augment the biasing of the bobbin against the separator of the cell so as to maintain good contact therebetween. A tab 48 is shown secured at one end to screen 46 with its opposite end extended so as to be available for securement to the cell cover in a manner as discussed with reference to the strip 22 and FIG. 5.

EXAMPLE 1

Several elastically deformable carbonaceous cathode collector bobbins, as shown in FIG. 2, were made using acetylene black and Teflon (trademark for polytetrafluoroethylene) in the amounts shown in Table I.

TABLE I

| Mix Component | Mix A | | |
|---|---|---|---|
| | Weight or Volume | % by Wt. in Dry Mix | |
| Acetylene Black | 10.0 g | 75% | |
| *"Teflon" Emulsion T-30B | 5.55 g | 25% ("Teflon") | |

TABLE I-continued

| Ethyl Alcohol | 100 ml | — |
|---|---|---|
| Water | 420 ml | — |
| | Mix B | |
| Acetylene Black | 10.0 g | 90% |
| *"Teflon" Emulsion T-30B | 1.85 g | 10% ("Teflon") |
| **"Tergitol" 15S9 | 0.45 g | — |
| Water | 700 ml | — |

*Obtained commercially from du Pont and contains basically polytetrafluoroethylene - 60% solid.
**Obtained commercially from Union Carbide and contains mainly nonionic polyglycol ether.

The acethylene black of Mix A was wetted with the wateralcohol solution and mixed until the acetylene black was completely wetted and dispersed. The Teflon emulsion was then added and thoroughly mixed with the solution after which the water content of the slurry was reduced to less than 5%. The cake so formed was broken up into a powder form and then molded into a slotted annular bobbin. The bobbin, while still retained in a carrier, was heated for 30 minutes at 370° C. This sintering operation was found to impart elasticity or spring-like characteristics to the slotted bobbin which allowed the bobbin to be radially compressed so as to close the slot until the opposing faces touched and then, when the compression was released, the bobbin returned to its original geometry without breaking or splitting. This demonstrated the elastic deformability of a bobbin suitable for use in the subject invention.

For Mix B, the acetylene black was slowly added to a well-stirred solution of water, Tergitol and Teflon emulsion until the acetylene black was thoroughly wetted and dispersed. The water in the slurry so formed was then substantially removed. The cake thus formed was then sintered in an inert atmosphere at 370° C for 30 minutes. The sintered cake was then broken up into fine particles of powder and molded into a slotted annular bobbin. The bobbin so formed exhibited good elastic characteristics which permitted the bobbin to be radially compressed so as to close the slot until the opposing faces touched and then, when the compression was released, the bobbin expanded radially outward to its original geometry without breaking or splitting. This test again demonstrated the elastic deformability of a bobbin suitable for use in the subject invention.

EXAMPLE 2

Using the procedure and composition of Mix A in Example 1 above, several slotted bobbins were molded, each of which had an expanded nickel mesh screen longitudinally embedded within the midsection of the bobbin (See FIG. 7). The spring-embedded bobbin so formed exhibited good elastic characteristics which permitted the bobbin to be radially compressed so as to close the slot until the opposing faces touched and then, when the compression was released, the bobbin expanded radially outward to its original geometry without breaking or splitting. This test again demonstrated the elastic deformability of a spring-embedded bobbin suitable for use in the subject invention.

EXAMPLE 3

Several "C" size cells were constructed similar to the cell construction shown in FIGS. 1 through 6. The cathode collector for each cell was made using the procedure and composition of Mix A so that in the final dry state, the bobbin contained 75% by weight of acetylene black and 25% by weight of polytetrafluoroethylene. The bobbin was 1.55 inches (3.9 cm) high, had a wall thickness of 0.24 inch (0.6 cm), an outside diameter of 0.78 inch (2.0 cm) and had a slot width of 0.1 inch (0.25 cm).

Each cell was assembled by inserting a 0.08 inch (0.2 cm) thick lithium sheet (coiled), 1.5 inches (3.8 cm) high, against the internal wall of a 304-stainless steel can. A lithium disc approximately the diameter of the can was disposed within the can to contact the inner bottom surface of the can. Thereafter, a glass separator disk was placed into the bottom of the can followed by a tubular glass separator (as specified in Table II) measuring 2.0 inches (5.08 cm) high, said insulating disk and tubular separator contacting the anode liner within the cell. The slotted bobbin was then inserted into the cell by first compressing the bobbin radially inward to reduce its outside diameter and then sliding it down into the cell within the tubular separator. Upon release of the compressive force, the slotted bobbin expanded radially outward thereby imparting a bias to the separator which in turn insured good contact between the slotted bobbin, separator and anode. A cylindrical section of expanded nickel screen having an extended nickel tab spotwelded to it was inserted into the axial opening in the bobbin making good physical and electrical contact therewith. The extended end of the nickel tab was projected through an opening in an insulating disk and a Teflon gasket and then welded to a stainless steel cover as described in conjunction with FIG. 5. Before sealing the cover to the can, the liquid cathode solution as specified in Table II was fed into the cell. The cell was then sealed in a conventional manner.

The cells were then discharged across a load and the data obtained from the tests are shown in Tables II and III.

As evidenced by the test data, an elastically deformable carbonaceous current collector in the form of a slotted annular bobbin can be used as a component part of an efficient liquid cathode cell system.

TABLE II

| Cell Sample | Separator Used | Cathode Solution | Volume of Cathode Solution Added (cc's) | Open Circuit Voltage (volt) | Initial Impedance (ohm) | Post Discharge Impedance (ohm) |
|---|---|---|---|---|---|---|
| 1 | *{ Mead Type 937 | {2 Molar Eutectic | 12.29 | 4.03 | 4.70 | 11.31 |
| 2 | { Nonwoven Glass | { $LiAlCl_4/SO_2Cl_2$ | 12.67 | 4.02 | 4.27 | 5.07 |
| 3 | " | " | 11.16 | 4.02 | 5.32 | 7.40 |
| 4 | " | {2 Molar Eutectic | 13.32 | 3.80 | 2.32 | 2.06 |
| 5 | " | { $LiAlCl_4/SOCl_2$ | 13.24 | 3.82 | 2.53 | 2.26 |
| 6 | " | " | 11.8 | 3.83 | 2.72 | 1.45 |
| 7 | " | " | 12.89 | 3.84 | 2.29 | 1.05 |
| 8 | *{ Mead Type LPM | {2 Molar Eutectic | 13.37 | 4.00 | 3.02 | 2.89 |
| 9 | { 3088-72 | { $LiAlCl_4/SO_2Cl_2$ | 12.91 | 4.03 | 4.6 | 4.38 |
| 10 | { Nonwoven Glass | " | 11.99 | 4.04 | 4.06 | 8.75 |
| 11 | " | " | 13.42 | 4.03 | 4.43 | 7.06 |
| 12 | " | {2 Molar Eutectic | 11.91 | 3.84 | 2.91 | 1.50 |
| 13 | " | { $LiAlCl_4/SOCl_2$ | 11.24 | 3.85 | 3.39 | 1.38 |
| 14 | " | " | 10.97 | 3.85 | 3.10 | 1.22 |
| 15 | " | " | 10.47 | 3.85 | 3.30 | 1.01 |
| 16 | **{ Uniglass 116- | {2 Molar Eutectic | 11.9 | 4.03 | 3.53 | 19.13 |
| 17 | { 50 | { $LiAlCl_4/SO_2Cl_2$ | 12.16 | 4.03 | 3.50 | 5.96 |
| 18 | { Woven Glass | " | 12.68 | 4.04 | 4.65 | 48.4 |
| 19 | " | 2 Molar Eutectic $SOCl_2$ | 11.0 | 3.86 | 2.49 | 3.08 |
| 20 | " | " | 9.72 | 3.84 | 2.65 | 1.22 |

*Obtained from Mead Paper Company
**Obtained from Uniglass Corporation

TABLE III

| CELL SAMPLE | DISCHARGE LOAD (ohm) | AVERAGE VOLTAGE (volt) | DISCHARGE CAPACITY (Ampere-Hours) | VOLUMETRIC Energy Density ( $\frac{Watt\text{-}hrs}{In^3}$ ) | ( $\frac{Watt\ hrs.}{cm^3}$ ) | Li EFFICIENCY* % |
|---|---|---|---|---|---|---|
| 1 | 42.7 | 3.30 | 6.34 | 14.0 | 0.858 | 93.59 |
| 2 | 42.5 | 3.32 | 6.47 | 14.37 | 0.881 | ** |
| 3 | 20.1 | 2.95 | 4.06 | 8.02 | 0.492 | 90.48 |
| 4 | 43.0 | 3.21 | 4.71 | 10.1 | 0.619 | 95.27 |
| 5 | 43.7 | 3.20 | 4.47 | 9.56 | 0.586 | ** |
| 6 | 20.7 | 3.05 | 3.01 | 6.13 | 0.376 | 82.11 |
| 7 | 20.2 | 3.06 | 2.85 | 5.85 | 0.359 | ** |
| 8 | 42.7 | 3.25 | 6.49 | 14.13 | 0.866 | ** |
| 9 | 43.0 | 3.28 | 6.53 | 14.36 | 0.880 | 88.05 |
| 10 | 20.7 | 3.14 | 5.88 | 12.39 | 0.760 | 93.88 |
| 11 | 20.5 | 2.96 | 6.12 | 12.14 | 0.744 | ** |
| 12 | 44.3 | 3.16 | 2.30 | 4.86 | 0.298 | ** |
| 13 | 44.5 | 3.26 | 3.795 | 8.28 | 0.508 | 91.50 |
| 14 | 20.3 | 3.28 | 3.811 | 8.37 | 0.513 | ** |
| 15 | 20.3 | 3.06 | 2.629 | 5.39 | 0.330 | ** |
| 16 | 44.0 | 3.37 | 6.404 | 14.49 | 0.888 | 89.97 |
| 17 | 20.0 | 3.20 | 6.067 | 12.99 | 0.797 | 91.98 |
| 18 | 44.0 | 3.31 | 6.775 | 15.08 | 0.924 | ** |
| 19 | 44.4 | 3.22 | 3.77 | 8.11 | 0.497 | 98.31 |
| 20 | 20.3 | 3.11 | 2.42 | 5.04 | 0.309 | 89.62 |

*Percent Li Efficiency = $\frac{Ampere\ hours\ delivered \times 100}{Ampere\ hours\ of\ Li\ provided\ -\ Ampere\ hours\ of\ Li\ remaining}$

**Li remaining after discharge was not analyzed, therefore, Li efficiency could not be calculated While the invention has been described in conjunction with the specific embodiments shown in the drawing, it is obvious that certain modifications may be made to the invention without deviating from the scope of the invention.

What is claimed is:

1. An electrochemical cell comprising an electrically conductive can closed at one end and open at the other end; an anode layer disposed within and in surface contact with said can thereby adapting said can as a first terminal for the cell; a porous separator layer disposed within and in surface contact with said anode layer; an elastically deformable carbonaceous cathode collector in the form of a slotted annular bobbin disposed within and in surface contact with said separator layer, said cathode collector exerting a bias against said separator which in turn contacts the anode thereby effectively maintaining good physical contact between the cathode collector, separator and anode during discharge of the cell; and active reducible cathode solution disposed within and through said cathode collector and said separator layer; a cover for said can; an insulating member interposed between said cover and the open end of said can such that a seal is formed between said cover and said can; and an electrically conductive means contacting said cathode collector and said cover thereby adapting said cover as the second terminal of the cell.

2. The electrochemical cell of claim 1 wherein the cathode collector contains a binder in an amount between about 10% and about 30% by weight of the collector, said binder selected from the group consisting of vinyl polymers, polyethylene, polypropylene, acrylic polymers, polystyrene, polytetrafluoroethylene, and rubber elastomers.

3. The electrochemical cell of claim 1 wherein a spring member is longitudinally disposed within the cathode collector approximately midway of its radial length.

4. The electrochemical cell of claim 1 wherein the cathode collector has a longitudinal slot with a width between about 0.05 inch (0.13 cm) and about 0.40 inch (1.02 cm).

5. The electrochemical cell of claim 1 wherein the cathode collector comprises about 75% by weight acetylene black and about 25% by weight polytetrafluoroethylene.

6. The electrochemical cell of claim 1 wherein the cathode collector comprises about 90% by weight acetylene black and about 10% by weight polytetrafluoroethylene.

7. The electrochemical cell of claim 3 wherein the cathode collector has a longitudinal slot with a width between about 0.05 inch (0.13 cm) and about 0.40 inch (1.02 cm).

8. The electrochemical cell of claim 3 wherein the cathode collector comprises about 75% by weight acetylene black and about 25% by weight polytetrafluoroethylene.

9. The electrochemical cell of claim 2 wherein the cathode collector comprises about 90% by weight acetylene black and about 10% by weight polytetrafluoroethylene.

10. The electrochemical cell of claim 3 wherein said spring member is expanded nickel.

11. The electrochemical cell of claim 1 wherein the cathode solution contains at least one oxyhalide of an element of Group V or Group VI of the Periodic Table.

12. The electrochemical cell of claim 1 wherein the cathode solution contains at least one halide of an element of Group IV to Group VI of the Periodic Table.

13. The electrochemical cell of claim 1 wherein the anode is lithium and the active reducible cathode is sulfuryl chloride.

14. The electrochemical cell of claim 1 wherein the anode is lithium and the active reducible cathode is thionyl chloride.

15. The electrochemical cell of claim 1 wherein the anode is lithium and the active reducible cathode is phosphorus oxychloride.

16. The electrochemical cell of claim 1 wherein the anode is lithium and the active reducible cathode is sulfur monochloride.

17. The electrochemical cell of claim 1 wherein the anode is lithium and the active reducible cathode is sulfur monobromide.

18. The electrochemical cell of claim 1 wherein the anode is lithium and the active reducible cathode is selenium tetrafluoride.

* * * * *

UNITED STATES PATENT OFFICE
CERTIFICATE OF CORRECTION

Patent No. 3,985,573          Dated  October 12, 1976

Inventor(s) Daniel H. Johnson et al.

It is certified that error appears in the above-identified patent and that said Letters Patent are hereby corrected as shown below:

Column 3, line 2, "purposes" should read -- purpose --.

Column 3, line 25, "menas" should read -- means --.

Column 9, TABLE II, Cell Sample 13, "$LiAlCl_4 ISOCl_2$" should read -- $LiAlCl_4/SOCl_2$ --.

Claim 9, line 16, "2" should read "3".

Signed and Sealed this twelfth Day of July 1977

[SEAL]

Attest:

RUTH C. MASON  
Attesting Officer

C. MARSHALL DANN  
Commissioner of Patents and Trademarks